United States Patent Office 2,866,685
Patented Dec. 30, 1958

2,866,685

PREPARATION OF LITHIUM NITRIDE

Hung Kei Henry Lam and Glen H. Schafer, Trona, Calif., assignors to American Potash & Chemical Corporation, a corporation of Delaware No Drawing. Application October 22, 1956
Serial No. 617,217

2 Claims. (Cl. 23—191)

This invention relates to the manufacture of lithium nitride, in accordance with the equation:

$$6Li+N_2=2Li_3N$$

This reaction was first reported by Ouvrard in 1892 (Comp. rend. 114, 120 [1892]). It is difficult to remove the fused lithium nitride produced by the method of Ouvrard from the reactor. To obviate this, Urfer (Canadian Patent 258,753) proposed reacting nitrogen with a lithium-mercury amalgam, but this method requires a rather elaborate mercury recovery system.

We have found that a friable, sintered mass of lithium nitride can be produced which can be easily removed from the reactor if the lithium metal is suitably dispersed in a suitable inert solid carrier. For example, we have found that by dispersing finely divided lithium in an inert granular carrier such as lithium nitride, the lithium can be reacted with nitrogen at a suitable elevated temperature to form lithium nitride. The resulting product is a friable, sintered mass of lithium nitride of high purity which can be easily removed from the reactor. Due care should be taken, of course, to exclude oxygen and moisture from the reactants and product.

The practice of the invention will become further apparent from the following, which is set forth by way of example and not by way of limitation. Lithium metal was first dispersed in mineral oil, washed with hexane and vacuum-dried. The dispersed lithium metal was then mixed with an equal volume of granular lithium nitride as a carrier; on a weight basis, approximately three parts of lithium metal were mixed with five parts of lithium nitride. This mixture was then placed in suitable boats and the boats placed in a Vycor tube. The tube was heated to about 400° C. and nitrogen gas was passed over the contents of the several boats in the tube for about fifteen minutes. Heating of the tube was then discontinued, and the tube allowed to cool. The contents of the boats were then removed. The product contained 95% $Li_3N$. It was friable, sintered and could be easily removed from the boats.

The quantity of the inert carrier utilized should be such in relation to the lithium metal that the latter is well dispersed. Preferably, the least amount of carrier is used in relation to the lithium metal as is possible because the carrier is inert and, to the extent that it is present, it reduces the capacity of the reactor. Usually, the quantity of lithium nitride employed as inert carrier should be at least about equal in weight to the lithium metal. The fineness of division of the lithium and carrier is not critical and one can use these from a size where all are about 10 mesh size to a size from minus 20 mesh and to minus 40 mesh. As inert carriers, one can use any solid substance that is inert to lithium, lithium nitride and nitrogen, and we have used iron powder and lithium chloride.

The reaction proceeds over a wide temperature range, being limited by the temperature at which lithium nitride melts, 840° C. The optimum temperature is about 400° C. although the reaction proceeds at an appreciable rate at any temperature above the melting point of lithium, 186° C.

We claim:

1. A process for producing lithium nitride comprising dispersing finely divided solid lithium metal in finely divided solid lithium nitride to provide a substantially homogeneous mixture of the solid lithium metal and the solid lithium nitride, heating the so-formed mixture in an atmosphere of nitrogen to about 400° C. to convert the lithium metal present to lithium nitride, then cooling and recovering the lithium nitride.

2. A process for producing lithium nitride comprising dispersing finely divided solid lithium metal in a finely divided solid inert carrier to provide a substantially homogeneous mixture of the solid lithium metal and the solid inert carrier, heating the so-formed mixture in an atmosphere of nitrogen to about 400° C. to convert the lithium metal present to lithium nitride, then cooling and recovering the lithium nitride from the carrier.

References Cited in the file of this patent

UNITED STATES PATENTS 943,132    Acker _____ Dec. 14, 1909

FOREIGN PATENTS 245,762    Great Britain _____ Oct. 28, 1926

OTHER REFERENCES

Mellor: "Comprehensive Treatise on Inorganic and Theoretical Chemistry," vol. 8, page 98.